May 20, 1947.　　　J. O. MULDERICK　　　2,420,717
CROSS CHAIN FOR ANTI-SKID TIRE CHAINS
Filed March 19, 1946
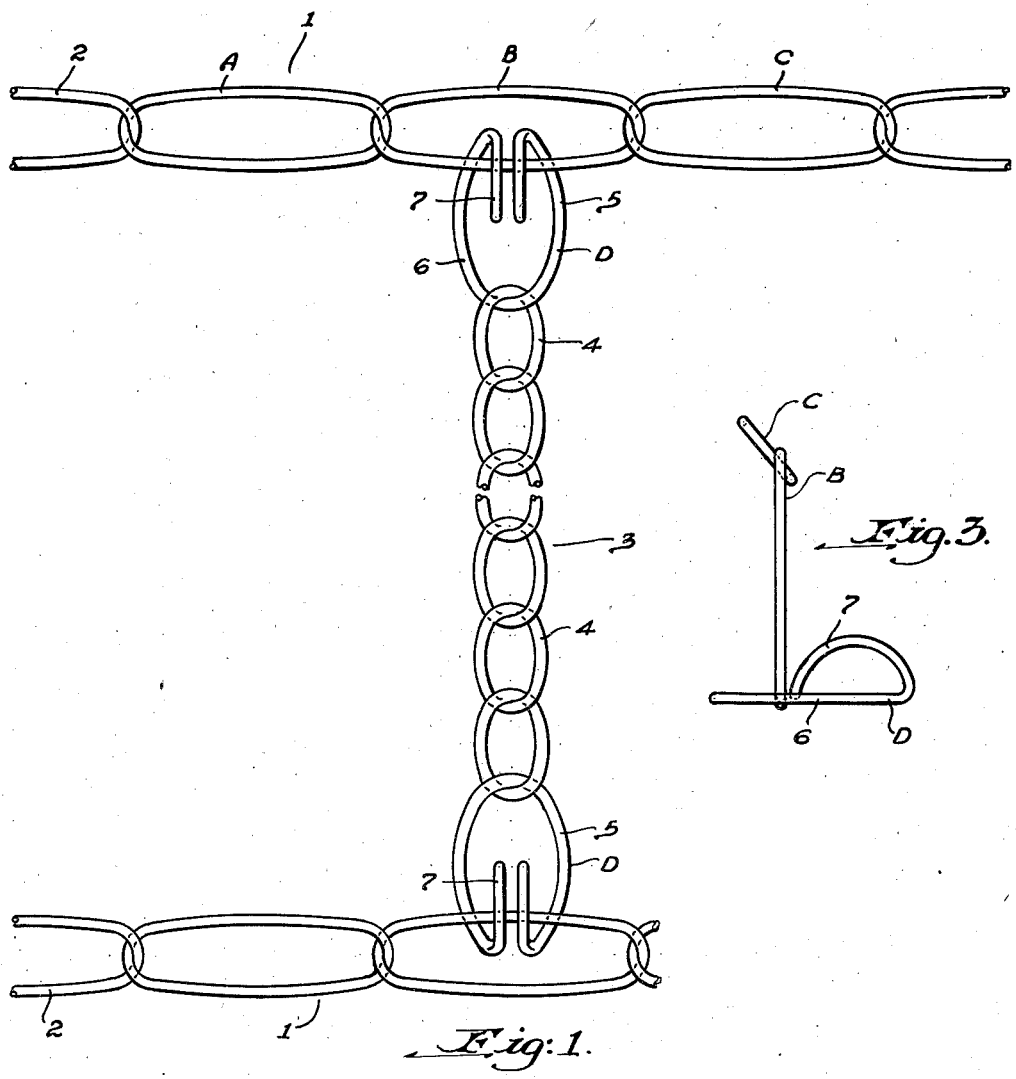
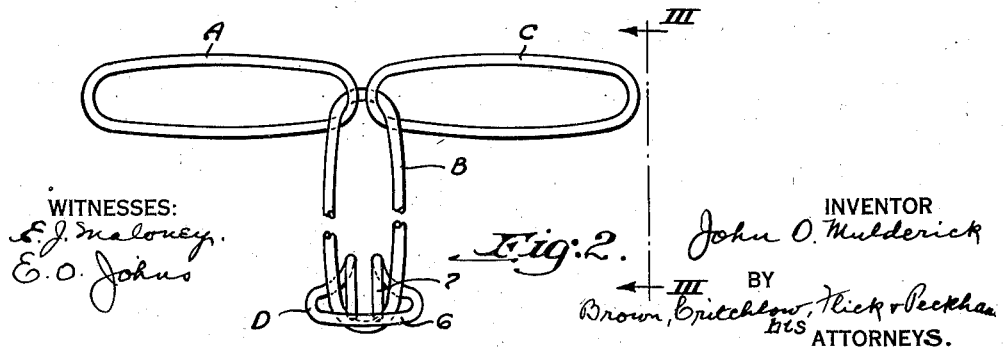
INVENTOR
John O. Mulderick
BY
Brown, Critchlow, Flick & Peckham
his ATTORNEYS.

Patented May 20, 1947

2,420,717

UNITED STATES PATENT OFFICE 2,420,717

CROSS CHAIN FOR ANTISKID TIRE CHAINS

John O. Mulderick, Monaca, Pa., assignor to S. G. Taylor Chain Company, Hammond, Ind., a corporation Application March 19, 1946, Serial No. 655,546

2 Claims. (Cl. 152—242)

1

This invention relates to anti-skid chains for vehicle tires and, in particular, to the connection of the cross chains to the side chains.

As is well known, the life of cross chains is extremely short as compared to that of the side chains to which they are connected. When a cross chain breaks, the remnants of it must be removed to avoid clattering against fenders, and a new cross chain put in place. This is a difficult and burdensome task since special tools generally are required to open and close the end hooks of the cross chains that connect them to the side chains. Various attempts have been made to provide automobile drivers with cross chains which can readily be attached and detached by hand, but insofar as I am aware such attempts have been unsuccessful.

It is the object of this invention to provide a cross chain that can be quickly and easily attached securely to side chains and disconnected therefrom without the use of tools.

According to the invention, a tire cross chain is provided having end links which are adapted to be connected to the side chain links of the side chains of an anti-skid tire chain. The outer end of each of the end links is doubled back on itself to form a hook through which a side of the side chain link extends when the hook is operatively connected. The free end of the hook extends close enough to the plane of the end link to keep the side of the side link from passing under it and thereby disconnecting the link. The opening in the end link is wide enough to allow only an end portion of the side link to be inserted therein and passed under the hook. With this arrangement of parts, the cross chain can readily be attached to each side chain by turning a link of the side chain at right angles to its adjacent side chain links, passing its end portion under the hook of the end link, and then again separating the adjacent side chain links. The effect of this separation is that the turned side chain link returns to its original position and a connection made between the side and cross chain in which the hook of the end link of the cross chain engages a side of the side chain link. Since that side of the side chain link cannot pass under the hook, a connection is made which can only be broken by again turning the side chain link and reversing the steps used in making the connection. In this manner a secure attachment is made without the aid of special tools.

The preferred form of my invention is shown in the accompanying drawings, in which Fig. 1 is a face view of a section of an anti-skid chain showing side chain links and a cross chain link connected together; Fig. 2 a like view of three side chain links and an end link of a cross chain in the positions they occupy when the cross chain is being connected to or removed from the side chain; and Fig. 3 is a view in the plane indicated by the line III—III of Fig. 2.

Referring to the drawings, the anti-skid automobile tire chain shown comprises a pair of side chains 1 formed of elongate links 2 having substantially straight sides and rounded ends, and a cross chain 3 having intermediate links 4 of any desired shape and end links 5. The end links are formed from metal rod or strip stock bent into loops 6 with their free ends bent back over the loops to form hooks 7. The hooks extend close together in substantially parallel relation and, as shown in Fig. 3, the free ends thereof extend at least to the plane of the loop which is sufficiently wide to receive the end portion of a side chain link.

For purposes of simplicity, the remainder of this description will have reference to three side chain links A, B and C and an end link D. Referring to Fig. 1, it may there be assumed that the chains are on a tire and that it is desired to attach the cross chain end link D to the side chain link B. Side chain links A and C are brought together into the relative position shown in Fig. 2, thereby permitting the side chain link B to be turned at right angles to them. There is usually sufficient slack in a side chain to do this, but if not the side chain connector may be unfastened. In this position, the rounded end of link B is inserted into loop 6 and then passed under the free ends of hook 7. The links A and C are then returned to their relative positions of Fig. 1, thereby drawing link B back into its original position in which its hook receives and engages the side of the side chain link B. The same procedure is followed in attaching link D at the other end of the cross chain to the other side chain.

After the cross chain has been attached, there is sufficient tension in the side chains to hold its links in the relative position of Fig. 1. The security of the connection is due to the fact that the free ends of hook 7 extend to the plane of loop 6 and the side of the side link B cannot pass under them. The connection will not part unless links A and C are drawn together, link B turned at right angles to them, and the end portion of link B inserted in the loop of end link D and passed under its hook. The chances of this happening unintentionally, even when the chain is not on the tire, are remote. Thus, I have provided a cross chain that is quickly and easily attached to or detached from a side chain and which effects a secure connection of these chains.

In the practice of this invention, the end connecting link D of cross chains may be made of tempered steel that is lighter than that used in conventional hooks that must be bent after they receive side chain links. Further, in forming the hook on the end link, the free ends of the hook should not extend materially through the plane of the loop portion since, if they did, they would rub against the side wall of the tire and weaken it.

According to the provisions of the Patent Statutes, I have described and illustrated what is considered to be the best embodiment of the invention. However, it is understood that, within the scope of the appended claims, the invention may be practiced by other forms than herein disclosed.

I claim:

1. In an anti-skid tire chain, the combination with a pair of side chains formed of elongate closed links adapted in service to lie on the opposite sides of a tire, said closed links being so formed and connected together that each can be turned to a position substantially at right angles to the adjoining side links, of a cross chain having end links connected to links of the side chains, the outer end of each of said end links being doubled back on itself to form a hook through which a side of one of the side links extends, the free end of said hook being disposed close enough to the plane of the end link to keep said side of the side link from passing under said free end under service conditions, and the width of the opening through said end link being great enough to receive said side link only when the latter is inserted endwise therein, whereby when the side link is turned at right angles to the adjoining side links its end portion can be inserted in said opening and passed under the free end of the hook to connect and disconnect the two links.

2. In an anti-skid tire chain, the combination with a pair of side chains formed of elongate closed links each having substantially straight sides and rounded ends which lie in a plane, and being adapted in service to lie against the opposite sides of a tire so that each such link can be turned to a position at right angles to the adjoining side links, of a cross chain having end links connected to the side chains, each of said end links being formed from a strip of metal bent into a loop with the end portions of the strip extending close together in the same direction in substantially parallel relation at the outer end of the loop, said end portions being bent back over said end of the loop to form a hook through which a side of one of the side links extends, the free end of said end portions being disposed substantially in the plane of the loop, and the width of said loop being great enough to receive said side link only when the latter is inserted endwise therein, whereby when the side link is turned at right angles to the adjoining side links its end portion can be inserted in said loop and passed under the free end of the hook to connect and disconnect the two links.

JOHN O. MULDERICK.

REFERENCES CITED

The following references are of record in the file of this patent:

UNITED STATES PATENTS

| Number | Name | Date |
|---|---|---|
| 1,260,350 | Edeborg | Mar. 26, 1918 |
| 1,536,556 | Beckwith | May 5, 1925 |